S. H. St. JOHN.
Barb for Fence-Wire.

No. 199,330. Patented Jan. 15, 1878.

WITNESSES

INVENTOR
Spencer H. St John.
by L. Deane.
ATTORNEY

UNITED STATES PATENT OFFICE.

SPENCER H. ST. JOHN, OF CEDAR RAPIDS, IOWA.

IMPROVEMENT IN BARBS FOR FENCE-WIRE.

Specification forming part of Letters Patent No. 199,330, dated January 15, 1878; application filed December 13, 1877.

*To all whom it may concern:*

Be it known that I, SPENCER H. ST. JOHN, of Cedar Rapids, in the county of Linn and State of Iowa, have invented certain new and useful Improvements in Barbs for Fence-Wire, of which the following is a specification:

My invention consists in a barb made of a staple pointed at the ends, placed astride the fence-wire, and secured in place by winding another barb around its prongs, between their ends and the main wire, to which the whole barb is more tightly fastened by spreading the limbs of the staple.

Figure 1:
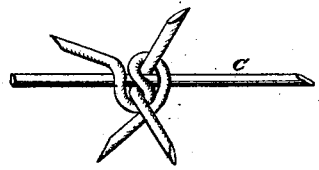
Figure 2:
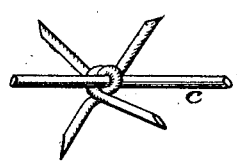
Figure 3:
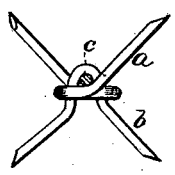
Figure 4:
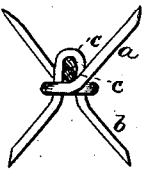
Figure 5:
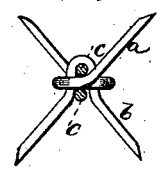
Figure 6:

In the accompanying sheet of drawings, Figures 1 and 2 represent sections of the barbed wire, showing the appearance of the barb on each side. Figs. 3, 4, and 5 show different ways of fastening the barb relative to the strands composing the main wire; and Fig. 6 is the staple.

The staple $b$, which forms the basis of the barb, is made, as will be seen, in the ordinary form, pointed at the ends, and needs no further description. This is placed astride the principal wire $c$, and the other part of the barb (indicated by the letter) $a$ is coiled around the prongs of the staple $b$, near the fence-wire, and between it and the points of the staple, before mentioned.

The barb $a$ is coiled in the form of an S, the central portion of which lies between the limbs of the staple and the coils inclosing them. The two parts of the barb being then pressed closely together and up to the main wire $c$ it is then still more securely fastened thereto by spreading the prongs of the staple, the effect of which is obvious. The extremities of the other part are then turned to correspond to the bend of the staple-legs until the four points are at or about equal distances apart, as represented in the drawings.

There being on one side of the main wire a bearing-surface of three strands, which bearing is rendered effectual and permanent by reason of the pressure caused by spreading the staple, a firm adherence of the barb to the fence-wire is thus secured. As a consequence, the barb retains its place upon the wire equally well, while less material is used than when both parts of the barb are coiled about the principal wire, and the advantage of less cost in manufacture is thereby gained.

When more than one strand is used in the fence-wire, the barb may encircle both or all of them; or it may only inclose one or more, while the remaining wire or wires lie outside of it, as indicated in the drawings.

Having thus described my invention, what I claim as new, and desire to secure by Letters Patent, is—

The barb made of a staple placed astride of the fence-wire, in combination with barb $a$, wound around the prongs of such staple, between their ends and the main wire, the whole secured in place by spreading the staple, substantially in the manner and for the purpose set forth.

In testimony that I claim the foregoing as my own witness my hand.

SPENCER H. ST. JOHN.

Witnesses:
R. H. GILMORE,
H. J. ST. JOHN.